Patented June 20, 1950

2,512,230

UNITED STATES PATENT OFFICE 2,512,230

JOINING OF CARBON BODIES TO OTHER BODIES

Charles Desmond Greaves and William Derrick Corlass Walker, London, England, assignors to C. D. Patents Limited, London, England, a British company No Drawing. Application February 2, 1948, Serial No. 5,904. In Great Britain February 7, 1947

4 Claims. (Cl. 154—75)

This invention consists of improvements in or relating to the joining of a carbon body to another body (viz. to another carbon body or to any other body having approximately the same coefficient of thermal expansion and wettability as the carbon body).

One object of this invention is to provide a method of joining together two carbon surfaces or one carbon surface and one other surface having approximately the same coefficient of expansion and wettability as the carbon surface.

According to this invention the method of joining a carbon body to another body (viz. to another carbon body or to another solid body having approximately the same coefficient of thermal expansion and the same coefficient of wettability as the carbon doy) consists in mixing a cyclic organic compound as defined below with finely divided carbon, adding concentrated sulphuric acid with agitation to make a paste, spreading the paste evenly on the joining surfaces, pressing them together and heating the joint slowly up to a temperature exceeding 100° C., preferably not less than 250° C.

The cyclic organic compound used in the method of this invention is essentially one which in reaction with sulphuric acid is decomposed and dehydrated so as to produce substantially carbon in a dense, strong, tough form. The cyclic organic compound has the following characteristics (1) It is a cyclic (viz. aromatic or heterocyclic) organic compound containing only carbon hydrogen and oxygen, (2) It has not less than 4 carbon atoms in the ring, (3) The ratio of hydrogen atoms to oxygen atoms is substantially or nearly 2:1 (i. e. the ratio found in water).

(4) The compound is readily decomposed and dehydrated by concentrated sulphuric acid to produce carbon in a dense, strong, tough, solid form.

(5) The compound is selected from the group consisting of furfural, quinone, pyrogallol and a simple derivative thereof.

The nature of this invention and of subsidiary features will be appreciated from the following description of examples in which proportions are given by weight.

Example I

A first mixture containing 50 parts of furfural and 25 parts of carbon black is prepared by thoroughly mixing these ingredients for about 10 minutes in a dough mixing or like mixing vessel.

A second mixture is prepared from 5 parts of concentrated sulphuric acid and 5 parts of carbon black.

These two mixtures are then blended thoroughly by vigorous stirring over a period of 2 to 3 minutes.

The jointing composition so made is at once spread evenly on the joining surfaces of two carbon plates or bricks which are lightly brought together so as to express any surplus composition which would prevent the formation of a continuous layer of more-or-less uniform depth. As a rough guide, a depth of $\frac{1}{32}$ inch is satisfactory for most purposes. The joints may conveniently be pointed with the same material, in known manner.

To complete the jointing operation, the joint is heated slowly in an electric oven (i. e. between 1½° C. and 3° C. per minute) up to a minimum temperature of 100° C. and is maintained at that temperature for about ½ hour. In some cases, for example when the jointed products are to be exposed to high temperatures or where a high degree of chemical inertness is required, it is necessary to raise the temperature to 300° C. or even higher. The atmosphere for this purpose need not be a reducing atmosphere but an inert atmosphere would be preferable in certain cases where either the porosity or the activity of the carbon composing the articles to be joined provides an appreciable danger of oxidation. For joining on site, for example in the course of building operations, the thermal radiation from electrical heating elements or even solid fuel fires may be employed. For small unit construction, an oven or kiln may conveniently be used.

Example II

A paste is made by mixing 45 grams of powdered quinone, 65 grams of methyl alcohol and 20 grams of powdered charcoal ground to pass a 90-mesh sieve. 10 cc. of concentrated sulphuric acid were then added with vigorous agitation. The mixture was then spread on two carbon faces to be joined which were then lightly pressed together and subsequently slowly heated to 200° C., the joint being then complete.

Mixtures of quinone and furfural may be similarly used.

The mixture of cyclic organic compound and carbon black may be made beforehand and preserved out of contact with air, but the sulphuric acid should be added immediately prior to applying the composition to the joining surfaces.

Because the reaction causing the setting of the cement takes place rapidly, when the surfaces have once been brought together the joint if for any reason broken can only be remade by removing the old cement and applying fresh composition. The heat treatment need not be applied until it is convenient to do so.

Mixtures of the cyclic organic compounds may be used instead of the single compounds.

We claim:

1. A method of joining a carbon body by way of a layer of material composed predominantly of elemental carbon to another body having approximately the same coefficient of thermal expansion and the same coefficient of wettability as the carbon body which method consists in preparing a paste by mixing a cyclic organic compound having not less than 4 carbon atoms in the ring and having a ratio of hydrogen to oxygen atoms substantially 2:1 and selected from the group consisting of furfural, furfuryl alcohol, quinone, pyrogallol and a derivative possessing the characteristic ring structure of such compounds with finely divided carbon and concentrated sulphuric acid, spreading the paste evenly on the joining surfaces, pressing these surfaces together and heating the joint slowly up to a temperature between 100° C. and 300° C.

2. A method of joining a carbon body by way of a layer of material composed predominantly of elemental carbon to another body having approximately the same coefficient of thermal expansion and the same coefficient of wettability as the carbon body which method consists in preparing a paste by mixing a cyclic organic compound having not less than 4 carbon atoms in the ring and having a ratio of hydrogen to oxygen atoms substantially 2:1 with finely divided carbon and concentrated sulphuric acid, spreading the paste evenly on the joining surfaces, pressing these surfaces together and heating the joint slowly up to a temperature between 100° and 300° C.

3. A method of joining a carbon body by way of a layer of material composed predominantly of elemental carbon to another carbon body, which method consists in mixing furfural with finely-divided carbon and concentrated sulphuric acid to form a paste spreading the paste evenly on the joining surfaces, pressing these surfaces together and heating the joint slowly up to a temperature between 100° and 300° C.

4. A method of joining a carbon body by way of a layer of material composed predominantly of elemental carbon to another carbon body, which method consists in first mixing furfural with very finely-divided carbon black to make a first paste, mixing concentrated sulphuric acid with very finely-divided carbon black to make a second paste, mixing a minor proportion of the order of 10 per cent of the second paste with the first paste, spreading the resulting paste evenly on the joining surfaces, pressing these surfaces together, allowing the assembly to stand at a temperature between 15° C. and 100° C. for a period exceeding 12 hours, and thereafter heating the joint slowly up to a temperature between 100° C. and 300° C.

CHARLES DESMOND GREAVES.
WILLIAM DERRICK CORLASS WALKER.

REFERENCES CITED

The following references are of record in the file of this patent:

UNITED STATES PATENTS

| Number | Name | Date |
| --- | --- | --- |
| 1,558,442 | Ellis | Oct. 20, 1925 |
| 1,682,934 | Richardson | Sept. 4, 1928 |
| 2,174,886 | Keifer | Oct. 3, 1939 |
| 2,174,887 | Keifer | Oct. 3, 1939 |